United States Patent [19]
Wong

[11] Patent Number: 5,980,043
[45] Date of Patent: Nov. 9, 1999

[54] OBJECT CELLS FOR HAND-HELD KALEIDOSCOPES

[75] Inventor: Jacob Y. Wong, Goleta, Calif.

[73] Assignee: Jaesent, Inc., Goleta, Calif.

[21] Appl. No.: 09/022,158

[22] Filed: Feb. 11, 1998

Related U.S. Application Data

[63] Continuation-in-part of application No. 08/971,092, Nov. 14, 1997.

[51] Int. Cl.$^6$ ..................................................... G02D 23/00
[52] U.S. Cl. .................................................. 353/2; 359/617
[58] Field of Search ........................... 353/1, 2; 359/616, 359/617; 40/406, 407; 446/267

[56] References Cited

U.S. PATENT DOCUMENTS

| | | |
|---|---|---|
| 3,738,036 | 6/1973 | Landsinger et al. .......................... 353/2 |
| 3,843,244 | 10/1974 | Facchini ....................................... 353/2 |
| 4,740,046 | 4/1988 | MacCathy ................................. 359/617 |
| 4,742,439 | 5/1988 | Choate ........................................ 353/2 |
| 5,431,615 | 7/1995 | Correll ..................................... 446/267 |

*Primary Examiner*—William Dowling
*Attorney, Agent, or Firm*—Daniel C. McKown

[57] ABSTRACT

One type of kaleidoscope has an object cell that contains a multitude of small objects immersed in a viscous liquid. By inverting the object cell, a user can enjoy a continuous ever-changing display of pleasing and colorful symmetrical images as the objects cascade through the viscous liquid under the influence of gravity. Eventually the objects settle to the top or bottom of the object cell as determined by their densities, and the viewer needs to invert the object cell again. It is desirable to prolong each cascade so as to reduce the frequency with which the object cell must be inverted. Several ways of accomplishing this are disclosed. The walls of the cell may converge and may be provided with bumps or other surface irregularities. The movement of the objects may be impeded by the provision of fixed obstacles within the object cell. In another approach, an upwelling and circulation of the viscous liquid is produced by a simple pump that is mobilized by inverting the object cell.

5 Claims, 4 Drawing Sheets

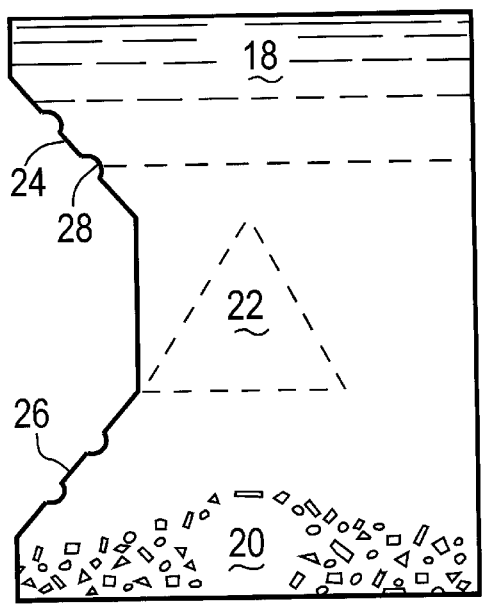
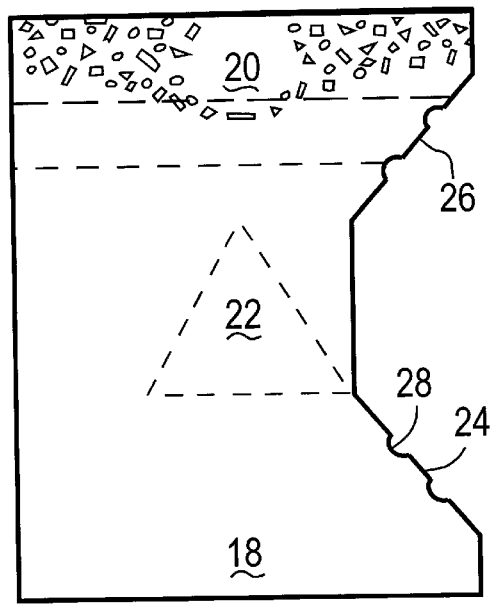
Fig. 1
Fig. 2
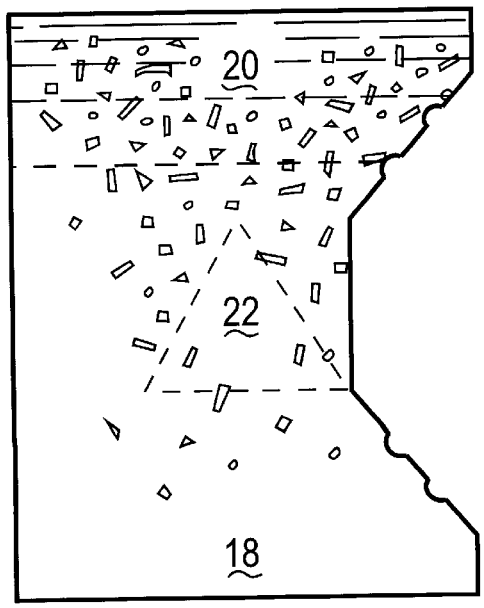
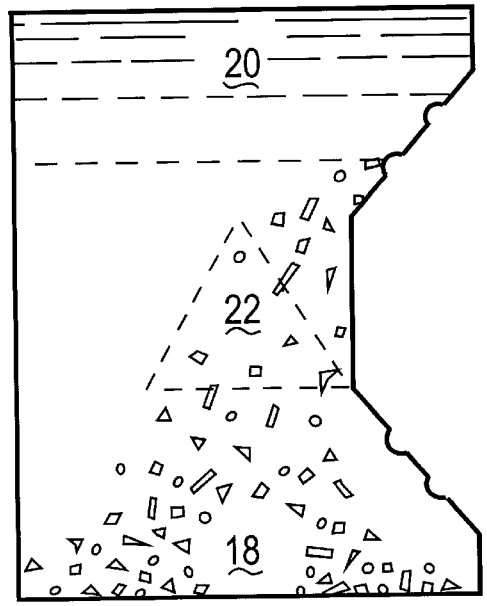
Fig. 3
Fig. 4

OBJECT CELLS FOR HAND-HELD KALEIDOSCOPES

CROSS REFERENCE TO RELATED APPLICATIONS

The present invention is a continuation-in-part of U.S. application Ser. No. 08/971,092 filed Nov. 14, 1997 for ILLUMIATING SYSTEM FOR KALEIDOSCOPES and a second application recently filed by the present inventor for POWER PROPELLED KALEIDOSCOPE. The disclosures of those applications are incorporated herein by reference to avoid unnecessary repetition of background material.

STATEMENT RE FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

This invention relates to the field of optical toys and amusement devices. More specifically, this invention relates to a kaleidoscope wherein the shape, structural design and contents of the object cell (typically a clear transparent viscous liquid and a plurality of colored discrete particles commonly referred to as "objects") cause these "objects" to move from one part of the object cell (for example the top) to another part of the object cell (for example the bottom) under the force of gravity following an initial turnover in a length of time that is controllable by design. Consequently, during this preselected length of time, typically several minutes, eye-pleasing symmetrical patterns, as observed through the eyepiece of the kaleidoscope, can be attained as the liquid and "objects" settle without the viewer having to rotate or re-orient the object cell with respect to the mirror system of the kaleidoscope.

2. The Prior Art

The kaleidoscope is an optical instrument invented and patented by Sir David Brewster circa 1816. In its simplest forms, it comprises either of two basic systems of mirrors, namely the 2-mirror system, which produces one central image and the 3-mirror system, which produces images reflected throughout the entire field of view. The mirrors in both systems are set up in a triangular configuration in a tube similar to a hollow prism.

In the following discussion, the end of the kaleidoscope housing the eyepiece and therefore nearer the viewer will be referred to as the proximal end. The opposite end, farther away from the viewer, will be referred to as the distal end.

Located at the distal end is an object chamber or cell in the form of a short hollow cylinder containing a plurality of small contrasting colored discrete particles in a clear transparent viscous liquid. These discrete particles, commonly referred to as the "objects" of the object chamber, are imaged by the mirror system. The totality of a kaleidoscope comprises the object chamber, the mirror system and the eyepiece, all housed inside a cylindrical tube, which is usually decorated externally to enhance the appearance of the instrument. It is the design of the object chamber, however, that governs the lighting of the colored "objects" inside, whose eye-pleasing symmetrical pattern images are seen by the viewer through the eyepiece of the kaleidoscope.

For most hand-held kaleidoscopes, the object chamber has two transparent ends. Light enters the object chamber through its exposed end. Alternatively, the exposed end of the object chamber is blackened to be opaque to light, and the cylindrical side wall of the chamber is made transparent to allow external light to enter the object chamber only from the side. Yet another configuration for this type of hand-held kaleidoscope calls for all faces of the object chamber disc to be transparent so that light can enter the object chamber not only through the exposed end, but also from the cylindrical side wall of the disc as well.

For a long time after the invention of the kaleidoscope, the illumination of the images created by the colored "objects" inside the object chamber of hand-held kaleidoscopes was mostly derived from natural lighting, either directly through the distal face or the periphery of the object chamber, or both. The advent of a new time and intensity variant artificial illumination system, complete with full audio sound effects, is the subject of U.S. application Ser. No. 08/971,092 filed Nov. 14, 1997 as ILLUMINATION SYSTEM FOR KALEIDOSCOPES of which the present application is a continuation-in-part. Most of the kaleidoscopes known in the art for many years have object cells that are affixed to the tube-like body of the kaleidoscope. Upon rotation of the entire kaleidoscope tube, the random distribution of "objects" inside the object cell is disturbed, thereby presenting a variety of pleasing and symmetrical images to the viewer. One such kaleidoscope was disclosed in U.S. Pat. No. 1,294,967 issued Feb. 18, 1919 to Anton Stabla. This patent shows an exceedingly simple and elegant construction of the kaleidoscope with the use of an inexpensive tube made from a single piece of material. The object chamber is formed by a pair of transparent plates, separated by a spacer, with a plurality of colored "fragments" disposed between them. Natural lighting is used to illuminate the object chamber through the transparent plate that closes the end of the tube. Upon rotating the entire kaleidoscope tube, the "fragments" inside the object chamber can be caused to tumble and thereby to create different images for the viewer of the kaleidoscope.

In U.S. Pat. No. 3,020,796 issued Feb. 13, 1962, Kaplan advanced the idea of incorporating a single electric lamp under the translucent object chamber of a stationary or table kaleidoscope as a means of illumination in lieu of natural light. A disk, which is made out of a variety of colorful patterns and figures, is interposed between the object chamber and the electric lamp and rotated to produce the desirable visual effects to be viewed. Although this idea of an effectively rotating object chamber for a table kaleidoscope by Kaplan is not applicable to hand-held kaleidoscopes, it did nevertheless represent the first rotating object chamber on record.

In U.S. Pat. No. 3,990,772 issued Nov. 9, 1976, Knott was the first to introduce an effective rotating object chamber for a hand-held kaleidoscope in the form of a rotating carriage retained at the distal end of the kaleidoscope tube and carrying with it a color disc and an opaque object box. As the carriage is made to rotate about the axis of the kaleidoscope tube, the colorful "objects" inside the object box are caused to tumble and thereby to produce a variation of continuously changing colorful patterns for the viewer.

In U.S. Pat. No. 5,131,734 issued Jul. 21, 1992, Hausner describes an improved objective illumination assembly for the hand-held kaleidoscope. Hausner includes an electric light source within the kaleidoscope tube body between the viewing end (eye-piece) and the object chamber. Furthermore, to rotate the object chamber, he devised a special mechanical assembly including a small electric motor, a drive shaft and a rubber band harness. Hausner's invention represents the first power-assisted hand-held kaleidoscope on record; it not only provided an artificial illumination system for the object chamber in lieu of natural lighting, but also provided a motorized mechanical assembly for producing an everchanging display of symmetrical images for the viewer. Unfortunately such a device was relatively fragile and yet complicated to build, making it costly to manufacture. Such an assessment of Hausner's invention is borne out by the fact that to date it remains mainly a curiosity piece and has never been widely adopted and copied in the industry.

In U.S. Pat. No. 4,740,046 issued Apr. 26, 1988, Mac-Carthy introduced a so-called "liquid" kaleidoscope wherein the object chamber consists of one or more tubular sections in which a liquid and colored solids are constrained to flow in spatially confined volumes and in controlled directions. MacCarthy's tubular object chambers do not entirely fill the whole field of view, and they confine the liquid and solids to move in plug-like flow along the channels defined by the tubes. The object chamber which contains this assembly of closed tubes can be rotated in a clockwise or a counter-clockwise direction.

In 1993, Eikich and Baker in U.S. Pat. No. B1-5,029,954 (originally issued Jul. 9, 1991 as U.S. Pat. No. 5,029,954 and reexamined in 1993) advanced the idea of a kaleidoscope having a removable object tube in lieu of a stationary object chamber. The length of this object tube whose mid section acts as the object chamber for the hand-held kaleidoscope can be many times the diameter of the kaleidoscope tube itself. The extent of the object tube's diameter, on the other hand, is not critical as long as it is larger than the aperture of the prism mirror system of the kaleidoscope. The object tube is filled with a clear transparent fluid having a plurality of discrete contrasting colored elements whose movements are subjected to the force of gravity. Thus when the object tube is being held with its axis vertical, all the discrete contrasting colored elements tend to drift downwards in the fluid towards its bottom. As these particles drift down through the aperture of the prism mirror system of the kaleidoscope, the effect created is equivalent to that of an object cell with its contents changing as a function of time. Thus in this manner the viewer is presented with a variety of changing colorful symmetrical images.

However, after a certain period of time has elapsed, typically one to two minutes, all the particles will have drifted downwards to the bottom of the object tube. At this point the object tube will cease to function as the object cell for the kaleidoscope because there are no more particles in the field of view of the prism mirror system. The viewer would have to flip the object tube with the kaleidoscope from end to end in order that the particles inside the tube can once again drift downwards towards its bottom.

It is clear from the discussion of the prior art presented above that several attempts have been made to simulate the visual effects of a "rotating object cell" for a hand-held kaleidoscope with the use of a single removable object tube (U.S. Pat. No. B1-5,029,954 to Eilrich and Baker) or an assembly of fixed ones filled inside with a clear transparent viscous fluid and a plurality of colorful particles (U.S. Pat. No. 4,740,046 to MacCarthy). In both cases the force of gravity is relied upon to act on the particles inside the tube in order to induce motional effects for the objects thereby requiring the viewer to physically re-orient the kaleidoscope from time to time. The elapsed time after which the viewer has to rotate or re-orient the kaleidoscope depends upon the viscosity and density of the liquid inside the object cell, the density or buoyancy of the objects in suspension and the physical length of the object cell itself. In the case of Eilrich and Baker's invention, even though the period or duration of motion is relatively long because of the very long object tube being used, it is nevertheless very cumbersome since it extends symmetrically and perpendicularly to the kaleidoscope tube at the distal end of the instrument.

Thus there exists a need for a kaleidoscope that has a specially designed object cell that is compact and capable of providing a very long duration of motional effects, thereby greatly reducing the frequency with which the object cell must be inverted to present the viewer a continuous ever-changing display of pleasing and colorful symmetrical images. The present invention with its novel object cell structural design serves to fill this need.

BRIEF SUMMARY OF THE INVENTION

In a first preferred embodiment of the present invention, the object cell is designed to have an extra large volume space at both the top and bottom so as to be able to store more solid particles or "objects" thus lengthening the "fall time" of these objects from the top to the bottom because of the larger quantity of such objects. Furthermore, the walls of these spaces contain a number of "bumps" or physical surface obstructions so as to retard the motion of the objects on their way from the top to the bottom under the force of gravity. The desirable "fall time" depends upon the volume of the object cell and the structural design for the "bumps".

In a second preferred embodiment, the object chamber, in addition to the added space at its top and bottom, also has additional motion retarding structures incorporated in its middle section thus further lengthening the "fall time" of the objects from the top of the object cell to its bottom.

In a third preferred embodiment, the falling of a ball through a cylinder of viscous liquid pumps some of the viscous liquid into the object chamber, thereby establishing liquid currents that retard the fall of the objects.

In all of these embodiments, the motional effects of the objects inside the object cell of the kaleidoscope can be repeated by simply inverting the object cell.

BRIEF DESCRIPTION OF THE SEVERAL VIEWS OF THE DRAWING

FIG. 1 is a diagram showing a front elevational view of a first preferred embodiment of the object cell of the present invention before initiation of the cascading action of the objects, with the field of view of the kaleidoscope mirror system indicated by dashed lines;

FIG. 2 is a diagram showing a front elevational view of the embodiment of FIG. 1 after the object cell has been inverted to initiate the cascading action of the objects;

FIG. 3 is a diagram showing a front elevational view of the embodiment of FIG. 1 after the objects have started to cascade;

FIG. 4 is a diagram showing a front elevational view of the embodiment of FIG. 1 when the cascading action has almost been completed;

DETAILED DESCRIPTION OF THE INVENTION

Figure 5:
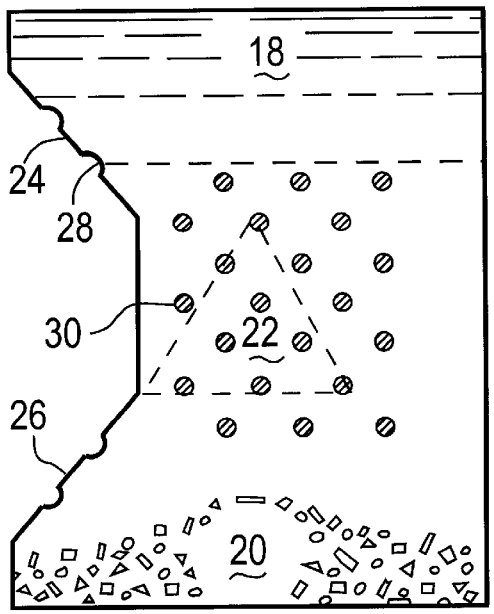
FIG. 5 is a diagram showing a front elevational view of a second preferred embodiment of the object cell of the present invention before initiation of the cascading action of the objects, with the field of view of the kaleidoscope mirror system indicated by dashed lines.

Several embodiments of the present invention will be described below. In each of the embodiments the field of view of the mirror system is shown in dashed lines. Note that nothing other than the object chamber and its contents appear within the field of view.

In each of the embodiments the object chamber has the same cross section at all stations along the longitudinal axis of the kaleidoscope. The front and rear walls of the object chamber are flat, parallel to each other, and perpendicular to the longitudinal axis of the kaleidoscope. Thus, the cross sections shown in the drawings all lie in planes that are perpendicular to the longitudinal axis.

In the drawings it is assumed for convenience that the object chamber is rotated about the longitudinal axis with respect to the body of the kaleidoscope (which contains the mirror system). Therefore, the field of view of the mirror system maintains its orientation in all of the drawings, while the object chamber is rotated 180 degrees about the longitudinal axis.

FIGS. 1–4 are a series of diagrams that show a first embodiment of the object chamber at successive instants of time. FIG. 1 shows the appearance of the object chamber prior to its rotation through 180 degrees. FIGS. 2–4 show the object chamber at three successive times following the rotation.

In this embodiment, the object chamber includes an enlarged upper space 18, an enlarged lower space 20, and a narrower central space 22 connecting the upper space and the lower space. Consequently, a portion 24 of the side wall slopes downwardly and inwardly while a lower portion 26 of the side wall slopes downwardly and outwardly. These portions 24 and 26 include inwardly directed bumps of which the bump 28 is typical.

The reasons for this peculiar shape are easily explained. The enlarged upper space 18 and lower space 20 permit a greater number of the solid particles to be included, thereby prolonging the cascading action and including a greater number of solid particles within the field of view. The sloping portion 24 of the side wall slows the downward progression of the particles, and the bumps 28 alter the trajectories of some of the particles. FIG. 2 shows the object chamber immediately after it has been inverted from the steady-state distribution shown in FIG. 1.

FIG. 3 shows the cascading action in full progress. The particles that were located directly above the narrower central space 22 in FIG. 2 are unopposed, but the particles that were above the portion 26 in FIG. 2 are retarded by the sloping wall 26 and by the bumps 28, thereby prolonging the falling action. Also, some of the particles that progress along the wall 26 acquire a horizontal velocity component, and they interact with the particles that are falling straight down.

FIG. 4 shows the distribution of the particles near the conclusion of the cascading action.

FIGS. 5, 6, 7, and 8 are a sequence showing the distribution of particles in a second preferred embodiment at successive times. Like the embodiment of FIGS. 1–4, this embodiment includes the enlarged upper space 18, the enlarged lower space 20, and the narrower central space 22. It also includes the portion 24 of the side wall that slopes downwardly and inwardly and the portion 26 of the side wall that slopes upwardly and inwardly. Also included are the bumps 28.

Significantly, the second preferred embodiment of FIGS. 5–8 further includes a number of motion impeding structures of which the structure 30 is typical. In this embodiment, the motion impeding structures have the form of rods extending between the flat front wall and the flat rear wall. The motion impeding structures 30, being solid, cause the descending particles to flow around them, thereby following an irregular path which makes the display seen by the viewer more interesting. FIG. 5 shows the initial distribution of the particles before the object chamber is inverted.

Figure 6:
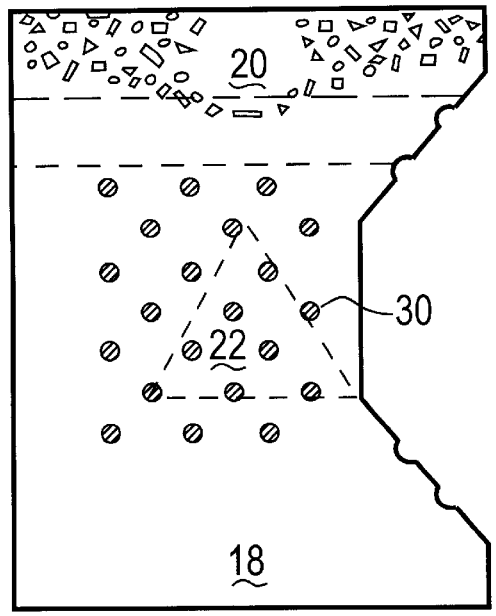
FIG. 6 is a diagram showing a front elevational view of the embodiment of FIG. 5 after the object cell has been inverted to initiate the cascading action of the objects.

FIG. 6 shows the distribution of the particles an instant after the object chamber has been inverted. The particles have not yet had time to begin their downward movement.

Figure 7:
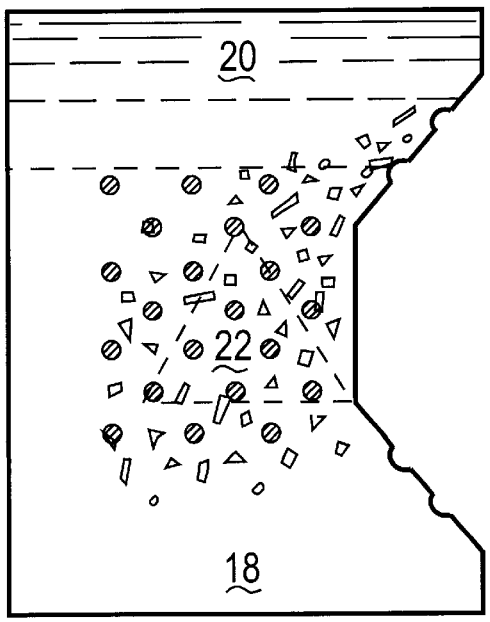
FIG. 7 is a diagram showing a front elevational view of the embodiment of FIG. 5 after the objects have started to cascade.
Figure 8:
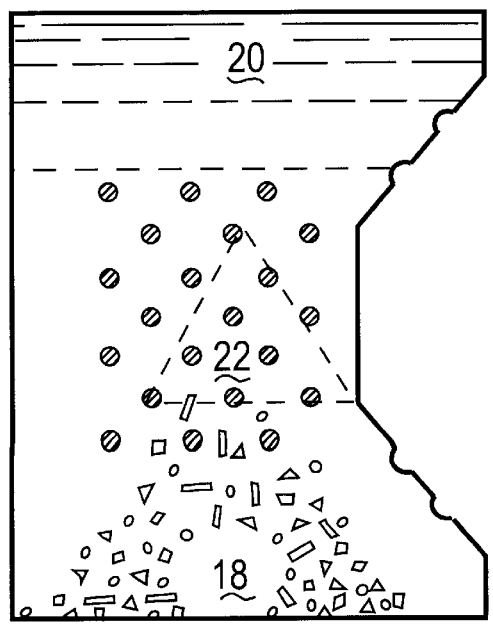
FIG. 8 is a diagram showing a front elevational view of the embodiment of FIG. 5 when the cascading action has almost been completed.

FIG. 7 shows the cascade of the particles in full progress, and FIG. 8 shows the distribution of the particles at a time near the conclusion of the cascading action.

Figure 9:
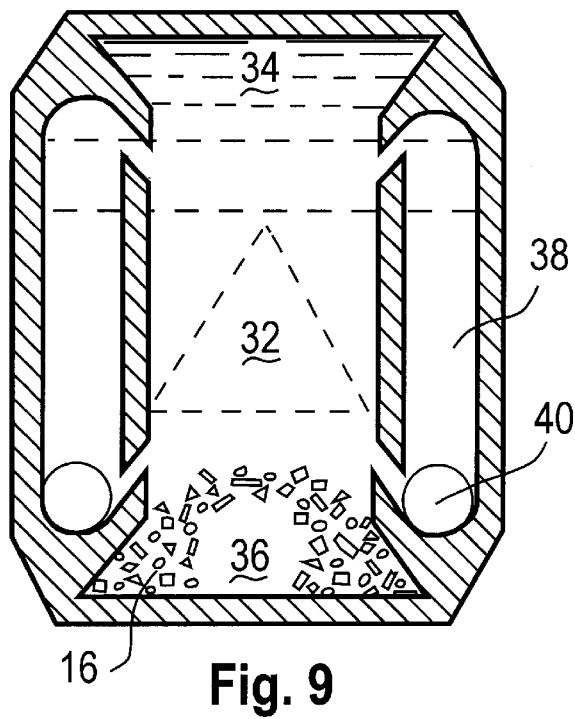
FIG. 9 is a diagram showing a front elevational view of a third preferred embodiment of the object cell of the present invention before initiation of the cascading action of the objects, with the field of view of the kaleidoscope mirror system indicated by dashed lines.

FIGS. 9, 10, 11, and 12 are a sequence showing the operation of a third preferred embodiment of the present invention. This embodiment employs a central chamber 32 having enlarged end portions 34 and 36. A pumping cylinder 38 communicates with the central cylindrical chamber near its ends. A ball 40, denser than the specific gravity of the viscous liquid, is included within the pumping cylinder and fits within it rather loosely so that the ball 40 can fall without obstruction through the length of the pumping cylinder 38. FIG. 9 shows the location of the ball 40 and of the particles 16 before the object chamber is inverted.

Figure 10:
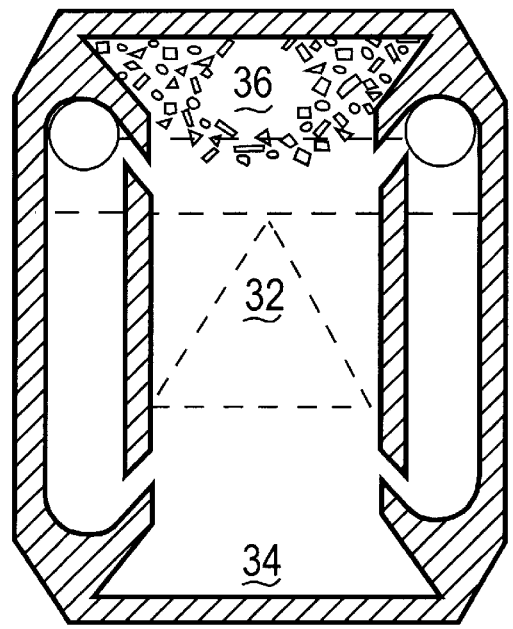
FIG. 10 is a diagram showing a front elevational view of the embodiment of FIG. 9 after the object of FIG. 9 after the object cell has been inverted to initial objects.

FIG. 10 shows the configuration an instant after the object chamber has been inverted.

Figure 11:
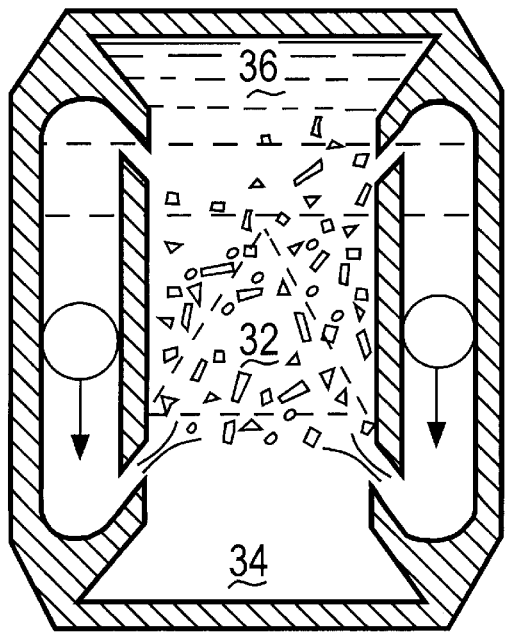
FIG. 11 is a diagram showing a front elevational view of the embodiment of FIG. 9 after the objects have started to cascade.

FIG. 11 shows the falling action in full progression. As the ball 40 falls in the pumping cylinder 38, it exerts a downward pressure on the viscous liquid, forcing the viscous liquid to flow upwardly into the central chamber 32. Meanwhile, the particles 16 are being pulled downward by gravity in the central chamber 32, and their downward motion is slowed, arrested, or reversed by the fluid flowing upward from the lower portion of the central chamber. This considerably prolongs the falling action which helps to achieve one of the objects of the present invention, namely, reducing the frequency with which the object chamber needs to be inverted.

Figure 12:
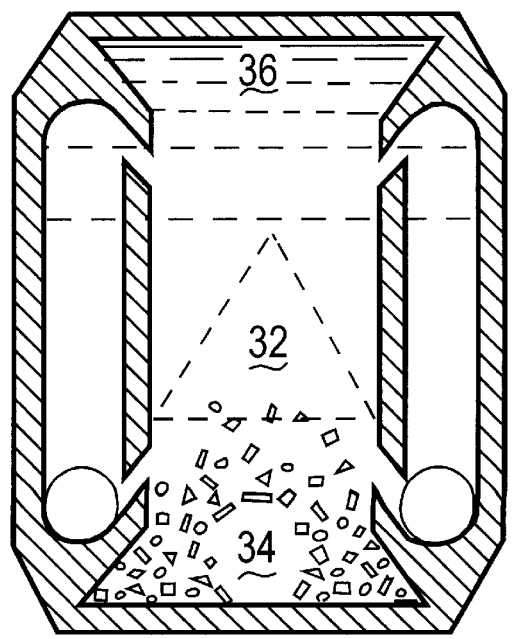
FIG. 12 is a diagram showing a front elevational view of the embodiment of FIG. 9 when the cascading action has almost been completed; and, FIG. 13 is a diagram showing a side elevational view of a variation on the third embodiment of the object cell of the present invention.

FIG. 12 shows the situation at the conclusion of the cascading action.

Figure 13:
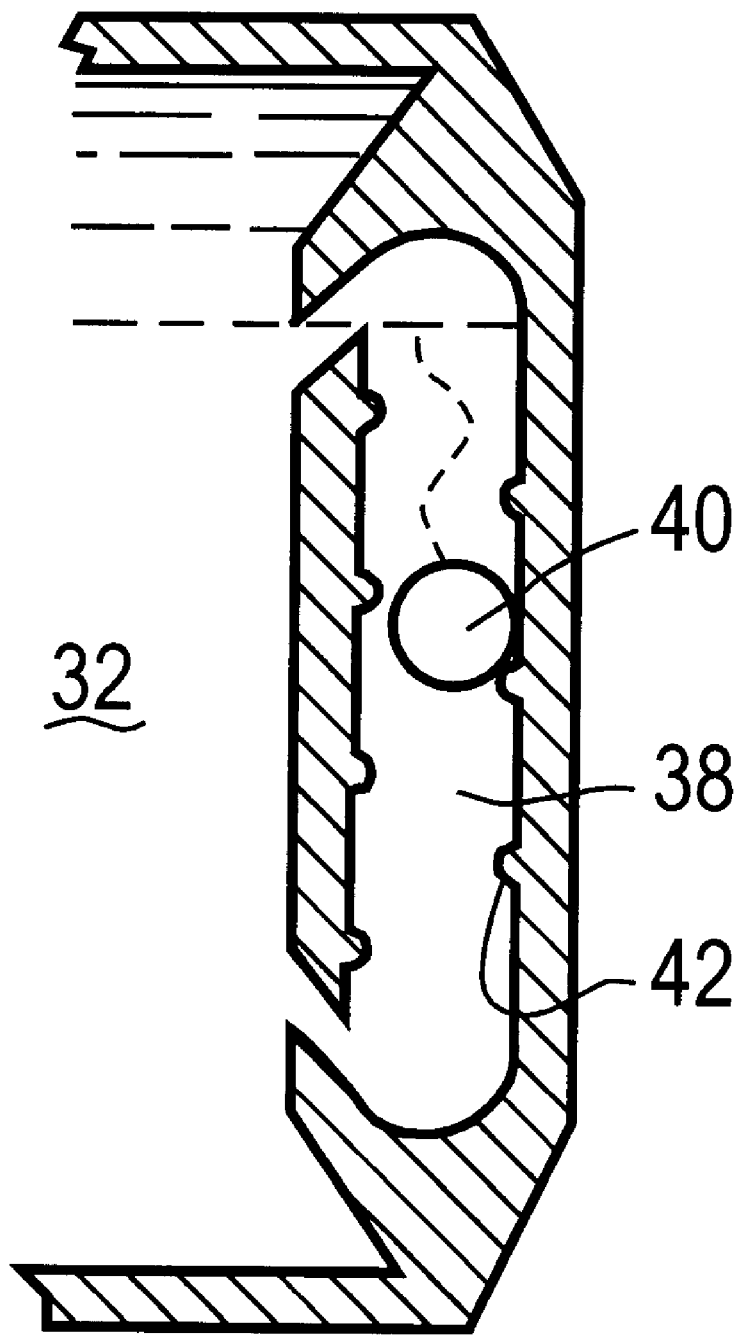

FIG. 13 shows a variation in which the rate of speed at which the ball 40 falls is reduced by including a series of bumps 42 on the inwardly facing surface of the pumping cylinder 38, care being taken to insure that the ball does not become stuck. The dashed line indicates the trajectory of the center of the ball.

Thus there have been described several embodiments of object chambers for use in hand-held kaleidoscopes. In these embodiments the object chamber has enlarged spaces at its upper and lower ends to accommodate a larger quantity of solid particles, while the central space is narrower. This results in a prolonged cascading of the particles when the object chamber is inverted. In some embodiments, one or two wall portions slope downwardly to slow the downward motion of the particles, and the provision of bumps on the sloping portion further slows the particles and imparts horizontal velocity components to them. In yet another embodiment, motion impeding structures extend horizontally in the space through which the particles fall. The falling particles must detour around these structures. This slows the speed of descent and also causes the particles to execute more interesting trajectories. In another embodiment a crude pump is formed by a ball falling in a cylinder filled with a viscous liquid. The pumped fluid is injected upwardly into the portion of the object chamber through which the particles fall. This stirs up the particles causing them to swirl about.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. An object cell for use in a kaleidoscope of a type having a mirror system which defines a field of view, said object cell comprising:
    a chamber having a flat front wall and a flat rear wall connected by a side wall that defines a uniform cross section for the chamber, said uniform cross section completely covering the field of view, said chamber including two opposite ends and a central portion that is narrower than said opposite ends;
    a viscous liquid substantially filling said chamber; and,
    a multitude of objects immersed in said viscous liquid.

2. The object cell of claim 1 wherein said side wall includes a plurality of bumps extending into said chamber to disrupt the paths of some of said multitude of objects when they move along said side wall.

3. The object cell of claim 1 further comprising a plurality of motion impeding structures extending within said chamber between said flat front wall and said flat rear wall to disrupt the paths of some of said multitude of objects when they move.

4. The object cell of claim 1 further comprising:
    a pump communicating with said chamber and injecting a viscous liquid into said chamber when activated by inverting the object cell.

5. The object cell of claim 4 wherein said pump further comprises:
    a vertically-oriented cylinder;
    a ball fitting loosely within said cylinder; and,
    a viscous liquid filling the space between said cylinder and said ball.

* * * * *